L. G. MERRITT & B. L. GALE.
VENEER DRYING APPARATUS.
APPLICATION FILED JULY 31, 1907.

974,903.

Patented Nov. 8, 1910.
7 SHEETS—SHEET 1.

Fig. 1.

L. G. MERRITT & B. L. GALE.
VENEER DRYING APPARATUS.
APPLICATION FILED JULY 31, 1907.

974,903.

Patented Nov. 8, 1910.
7 SHEETS—SHEET 3.

L. G. MERRITT & B. L. GALE.
VENEER DRYING APPARATUS.
APPLICATION FILED JULY 31, 1907.

974,903.

Patented Nov. 8, 1910.
7 SHEETS—SHEET 4.

L. G. MERRITT & B. L. GALE.
VENEER DRYING APPARATUS.
APPLICATION FILED JULY 31, 1907.

974,903.

Patented Nov. 8, 1910.
7 SHEETS—SHEET 5.

FIG-6-

WITNESSES

INVENTORS

ATTORNEYS

L. G. MERRITT & B. L. GALE.
VENEER DRYING APPARATUS.
APPLICATION FILED JULY 31, 1907.

974,903.

Patented Nov. 8, 1910
7 SHEETS—SHEET 6.

Fig. 7.

UNITED STATES PATENT OFFICE.

LOUIS G. MERRITT, OF LOCKPORT, AND BURTON L. GALE, OF BUFFALO, NEW YORK, ASSIGNORS TO GERTRUDE I. GALE, OF BUFFALO, NEW YORK, AND ANNA HAYWARD MERRITT, OF LOCKPORT, NEW YORK.

VENEER-DRYING APPARATUS.

974,903.  Specification of Letters Patent.  Patented Nov. 8, 1910.

Application filed July 31, 1907. Serial No. 386,338.

*To all whom it may concern:*

Be it known that we, LOUIS G. MERRITT and BURTON L. GALE, residing at Lockport, in the county of Niagara and State of New York, and at Buffalo, in the county of Erie and State of New York, respectively, have invented certain new and useful Improvements in Veneer-Drying Apparatus, of which the following is a full, clear, and exact description, such as will enable others skilled in the art to which it appertains to make and use the same.

This invention relates to veneer drying apparatus, and one of the objects of the invention is to provide apparatus of the above character such that loading and unloading may be effected with greater facility than has been possible in apparatus of this type as hitherto constructed, and wherein the normal operation of the machine will in no wise be affected during the loading and unloading operations.

Another object hereof is to provide a veneer drying machine wherein the cost of maintenance and the power required to operate the same are reduced to a minimum.

Other objects will be in part obvious and in part pointed out hereinafter.

The invention accordingly consists of the features of construction, combinations of elements and arrangement of parts which will be exemplified in the construction hereinafter set forth, and the scope of the application of which will be indicated in the following claims.

Figure 1:
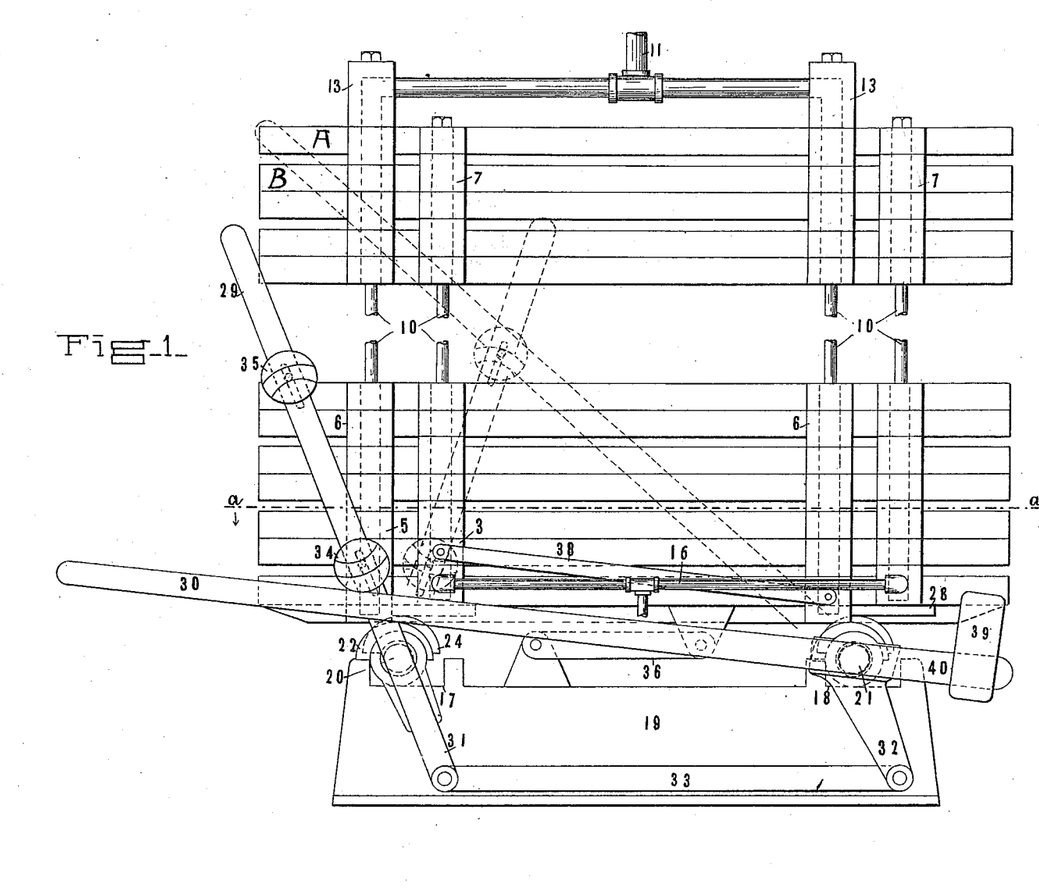
Figure 2:
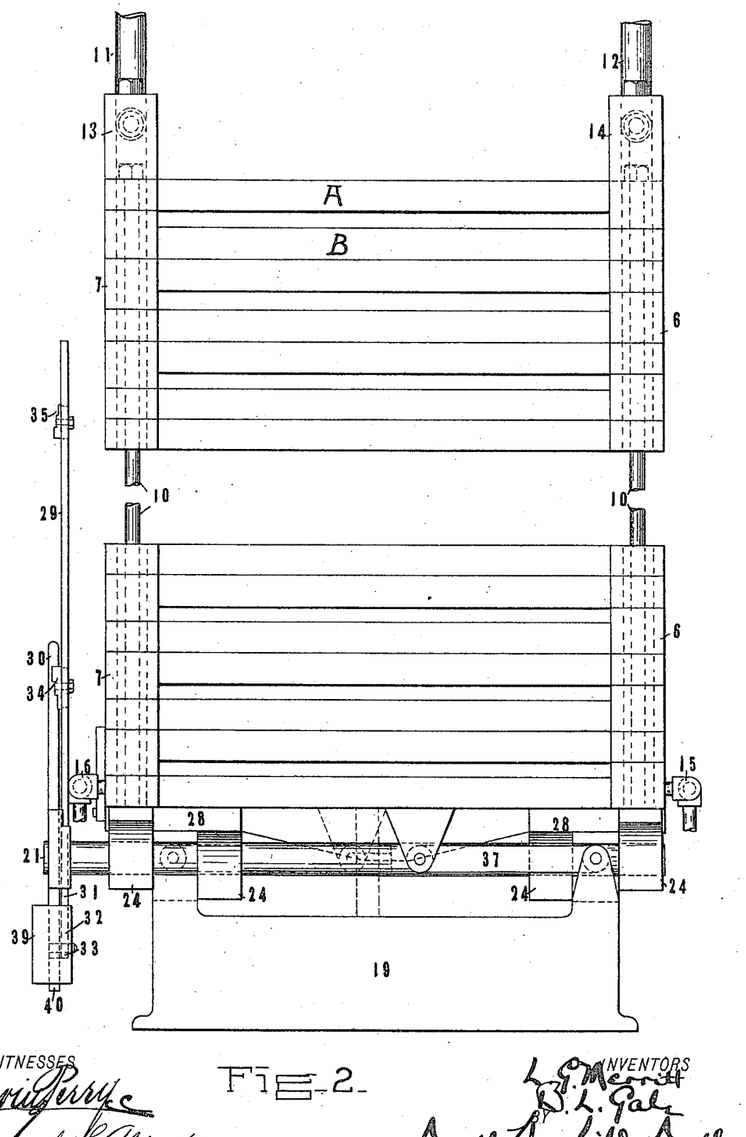
Figure 3:
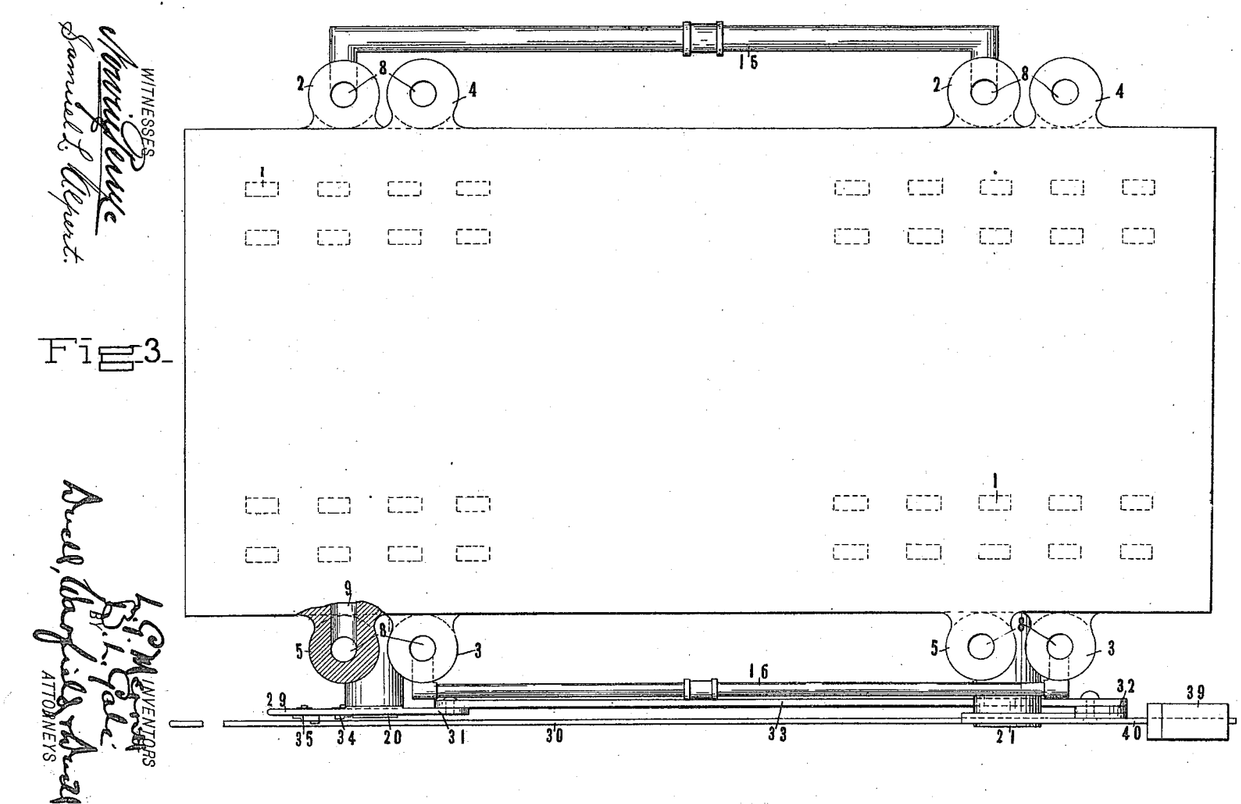
Figures 4, 5, 9, 10, 11, 12, 13, 14, 15:
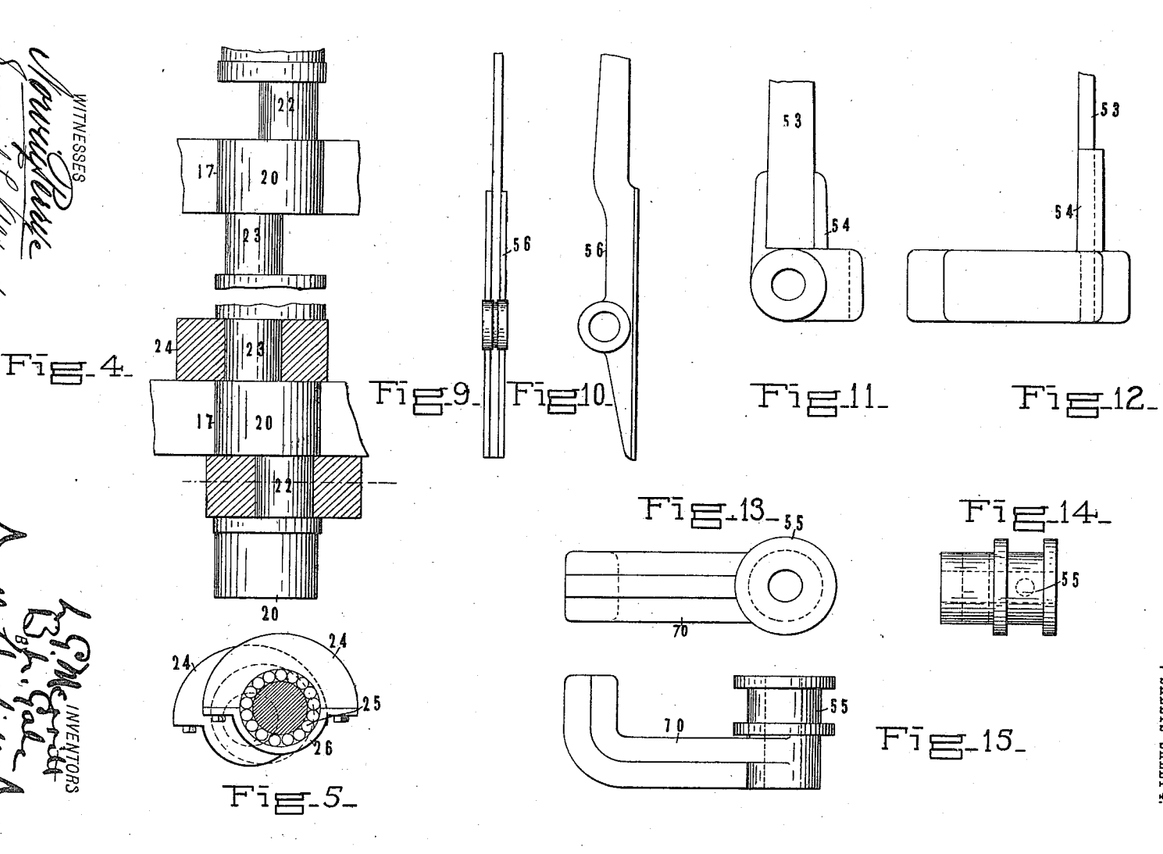
Figure 6:
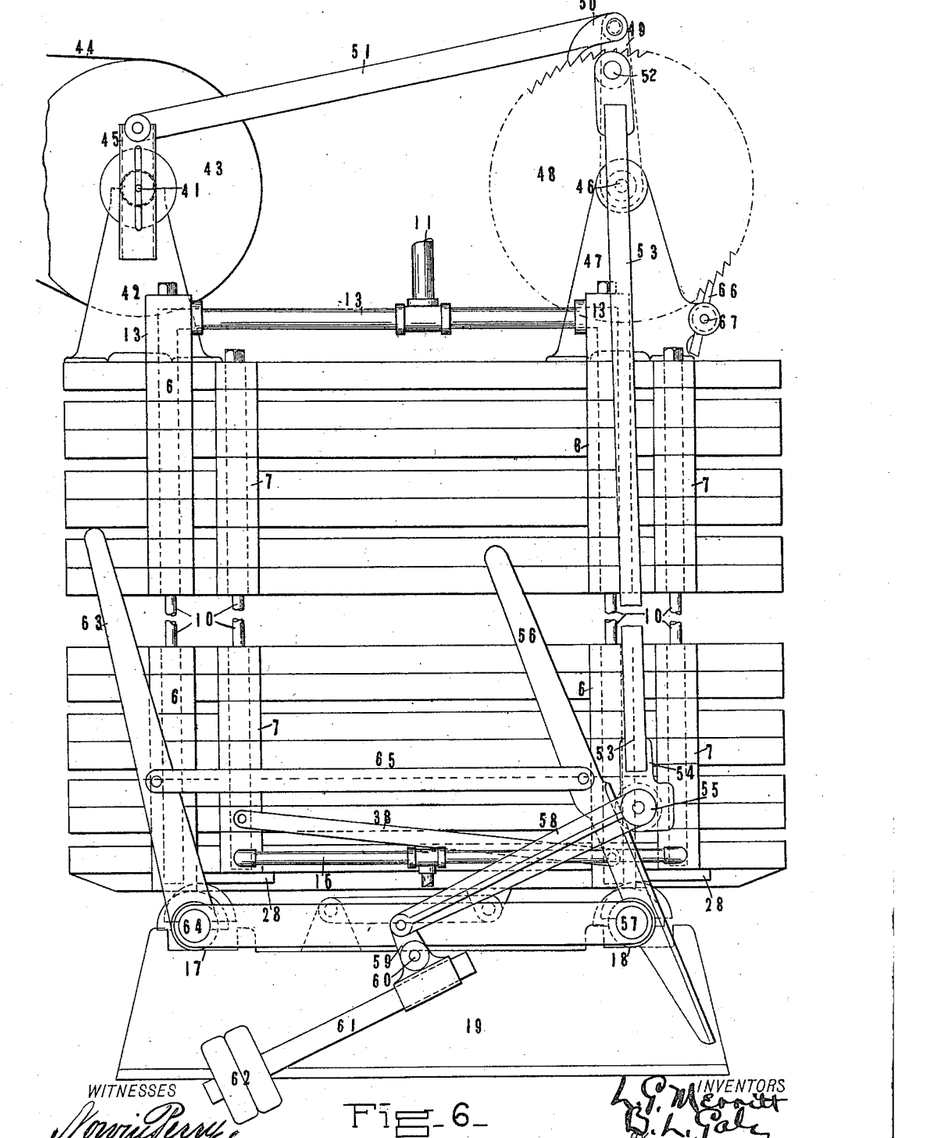
Figure 7:
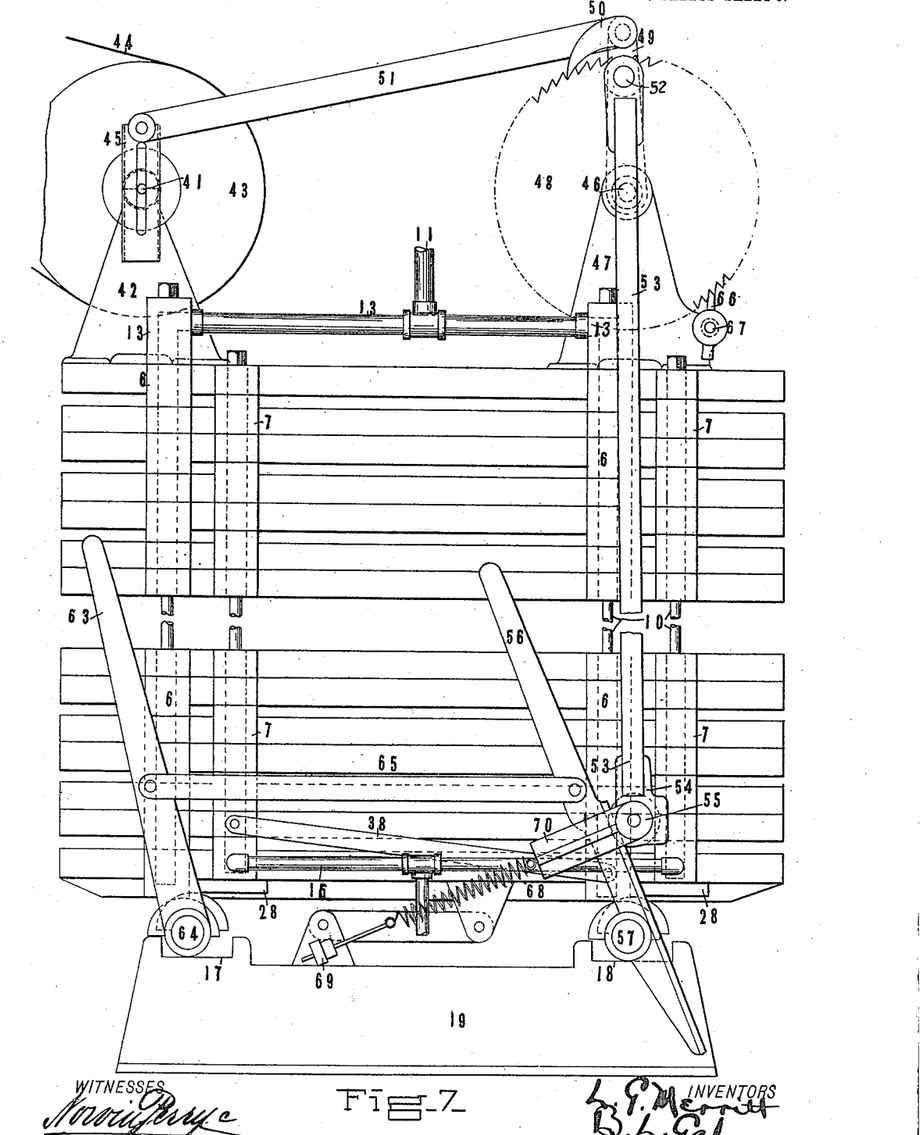
Figure 8:
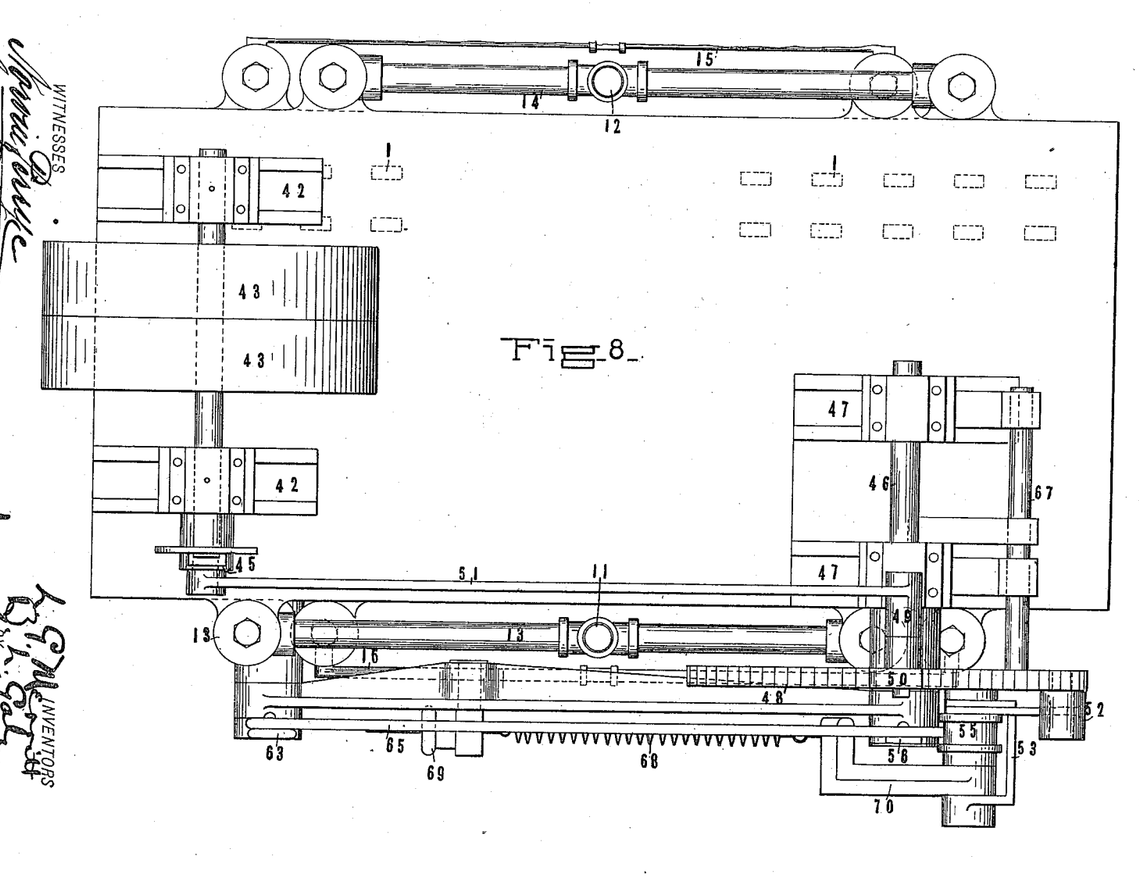

In the accompanying drawings, wherein are illustrated several of the various possible embodiments of our invention,—Figure 1 is a view in side elevation of a preferred embodiment of the same. Fig. 2 is a front elevation thereof. Fig. 3 is a horizontal sectional view taken substantially on line *a—a* of Fig. 1 with certain loose parts removed and other parts in section for the sake of clearness. Fig. 4 is a view partly in section and partly in elevation, of one of the eccentric shafts employed to move the platens. Fig. 5 is a vertical sectional view taken through the eccentric shaft, showing the manner of journaling the segmental bearing blocks which support the platens thereon. Fig. 6 is a view in side elevation of another embodiment of our invention. Fig. 7 is a similar view of still another embodiment thereof. Fig. 8 is a top plan view of the embodiment illustrated in Fig. 7. Fig. 9 is an edge view in elevation of the operation lever which is attached to one of the eccentric shafts. Fig. 10 is a side elevation thereof. Fig. 11 is a view in side elevation of the rod carrying a roller which operates on the lever illustrated in Figs. 9 and 10. Fig. 12 is a view in elevation of the parts shown in Fig. 11 looking in another direction. Fig. 13 is a view in elevation of the link connected with the roller mounted upon the rod disclosed in Figs. 11 and 12. Fig. 14 is a view in elevation of the roller mounted upon said rod; and Fig. 15 is a top plan view of the link illustrated in Fig. 13, showing the manner of connecting the same with the roller.

Similar reference characters refer to similar parts throughout all the views of the drawings.

Referring now to the drawings, and to our preferred embodiment which is illustrated in Figs. 1 to 3 inclusive, A indicates a series of hollow plates or platens arranged horizontally one above another, and B indicates a similarly disposed series of platens, the individual platens of each series being disposed in alternate relation with the platens of the other series, as is clearly shown in Figs. 1 and 2 of the drawings. Each of platens A and B has its opposite walls interiorly connected by tying members 1, as shown in Fig. 3, to prevent the same from bulging under the pressure of the heating medium, which in the present instance is steam. Each platen in the present instance is provided with four laterally extending hollow ears, two of said ears being arranged upon the opposite edges as at 2 and 3, and 4 and 5 respectively, the corresponding ears of each series of platens being disposed in vertical alinement. Between the ears of each series of platens are hollow spacing collars 6 and 7 respectively, the ears of the series of platens indicated at A with the intervening collars, and the ears of the series of platens indicated at B with their intervening collars, each forming four parallel columns, two for each series upon each side of the machine, the two columns upon each side constituting supports for each of series A and B. Each of the four ears of each platen is provided with vertical apertures 8 and a passageway 9 connecting the said aperture with the interior of the plate, and through the apertures 8 and the spacing collars interposed there between are extended rods 10 which are of smaller diameter than apertures 8 and those of the spacing collars, said rods operating as rigid connecting means for each series of platens; in other words, the platens constituting the series indicated at A are rigidly connected and adapted to move as a single element, and the series of plates indicated at B are similarly connected and adapted to move as a single element, as will be described hereinafter.

Live steam supplied through conduits 11 and 12 respectively, each of which is connected with one of the series of platens by means of cap pieces 13 and 14, enters one side of each series through the columns on that side, and exhausts through the two columns upon the opposite sides of the series through discharge conduits 15 and 16, there being two supply conduits and two exhaust conduits for each series of platens. At this point it may be noted that the spacing collars 6 and 7 are of greater dimensions than the width of the platens, so that the platens which constitute each series are spaced apart a sufficient distance to provide a space between the upper and lower surfaces of the adjacent platens, as is clearly shown in Figs. 1 and 2 of the drawings, so that if the top surfaces of the platens indicated at A are in contact with the under-surfaces of the platens B there will be an opening between the under surfaces of platens A and the upper surfaces of the adjacent platens B, or vice versa.

Resting on planed surfaces 17 and 18 of a suitable bed plate 19 near the ends thereof and having a rolling contact thereon are two shafts 20 and 21 respectively, and each of these shafts has near each end two eccentric portions 22 and 23, one of the eccentric portions of the shaft near each end being disposed oppositely from the other eccentric portion thereof. Each eccentric portion carries a segmental collar 24, which is journaled thereon by means of anti-friction rollers 25, and held in position by means of a strap 26, as shown in Fig. 5 of the drawings. The lowermost plate of the series B rests directly upon four of these segmental collars, and the other four segmental collars support the series A by means of shoes 28 provided beneath the lowermost of the platens which constitute said latter series. The weight of one series of platens is thus balanced by the weight of the opposite series of plates, inasmuch as the two series rest upon eccentric portions of the shafts which are oppositely disposed thereon, said shafts having a rolling contact with the plane surfaces of the bed plate.

Fixed upon shaft 20 is an operating lever 29, and attached to shaft 21 is a second operating lever 30, said operating levers being so mounted as to cross each other as shown in the drawings. These operating levers are connected through extensions 31 and 32 respectively, by means of a link 33, so that a rotative movement of one of said shafts will compel an equal rotative movement of the other thereof. In this manner, as will be seen, the two series of platens are counterbalanced and are readily moved with relation to each other by means of operating levers 29 and 30, whereby closures may be effected between certain of the opposing faces of the platens of the two series and apertures provided between the other set of opposing faces thereof.

Upon the lever 29 in the present instance are provided two adjustable disks 34 and 35, each of which has three notches. These notches co-act to lock the inclined lever 30, in the present instance, in three different positions, so that three different degrees of pressure may be exerted upon the veneers interposed between opposing faces of the platens of each series for a purpose which will be hereinafter made apparent. In order to avoid a horizontal movement of the plates, the lowermost platen of series B is connected to the bed plate by means of links 36 and 37 pivoted to said plate and to the bed respectively, the link 36 preventing lengthwise movement of the plate and links 37 a crosswise movement thereof. Lengthwise movement of the A series of platens is prevented by the link 38 connecting the bottom plate of this series to the bottom plate of the B series. If desired, a counterbalancing weight 39 for the lever 30 may be provided upon the extension 40 of said lever.

Having thus described the construction of this embodiment of our invention, the operation thereof is substantially as follows:—Assuming the platens to be in the position shown in Figs. 1 and 2 of the drawings, with the uppermost surfaces of the platens constituting the A series in engagement with the lowermost surfaces of the platens constituting the B series, veneers are inserted in the spaces provided between each of the lowermost surfaces of the A platens and the uppermost surfaces of the B platens. The apparatus being loaded with the veneers, operating lever 30 is disengaged from disk 34 of lever 29 and moved first to the position shown by the dotted lines in Fig. 1, lever 29 through its link connection with lever 30 moving to the position shown in dotted lines in this figure. It will be understood, of course, that live steam has been previously admitted to the platens of both series by means of the connections above described. The above-described movements of the operating levers 29 and 30 will through shafts 20 and 21 have moved the series of platens rela- tively to each other, so that the veneers are pressed between the lower surfaces of the A series of platens and the upper surfaces of the B series of platens, and spaces will have been provided between the oppositely disposed opposing faces of the two series of platens which in turn are filled with veneer. The machine now being loaded, the first-mentioned veneer is in contact with the platens, while the latter veneer lies loosely between the separated platens. At this point it may be noted that it is desirable in the first instance to carry the operating lever into the first notch of the disks, which should be set so that the platens will just touch the veneer without putting much pressure thereon. The veneer will then dry out and the shrinkage take place without splitting the same. When such shrinkage has taken place, and before the veneer is removed, the lever can be advanced to a second or third position and a greater pressure put upon the veneer in order to flatten it out before it is removed from the machine. In practice, however, this latter operation may not be required, since a sufficient pressure to flatten the veneer need not be heavy enough to prevent its shrinking. While this veneer is under pressure the sheets of fresh veneer lie in the open spaces between the platens, and gradually warm up before being brought under pressure between the heated platens.

Referring now to the embodiment of our invention illustrated in Fig. 6: In this embodiment we have illustrated a different manner of moving the two series of platens relatively to each other. In this embodiment of our invention we have provided automatic means for attaining this end, which we shall now proceed to describe. Carried by countershaft 41 journaled in hangers 42 secured as by means of bolts to the top plate of the machine, are tight and loose pulleys, one of which is shown at 43, which are adapted to be rotated by means of a belt 44 from any suitable source of power. Pulley 43 carries a crank slide 45 adapted to be set to give any desired throw. A second shaft 46 journaled in hangers 47, secured as by bolts to the top plate of the machine, carries at its outer end a ratchet wheel 48, about the hub of which is fulcrumed a ratchet lever 49, which at its upper end carries a gravity pawl 50 engaging the teeth of the ratchet wheel. Crank slide 45 and ratchet lever 49 are connected by means of a link 51 so that the ratchet wheel may be revolved one or more teeth at each rotation of pulley 43, in accordance with the throw given by the adjustment of the crank slide. Ratchet wheel 48 carries a crank pin 52, to which is pivoted a rod 53. This rod is given an up and down movement with every revolution of the ratchet wheel. Fixed upon the lower end of rod 53 is a frame or bracket 54, in which is journaled a flanged roller 55. This roller during the reciprocating movement of rod 53 travels over the planed edge of a lever 56 fast upon the eccentric shaft 57, which is constructed similarly to the shaft 21 employed in the first described embodiment of our invention. Fulcrumed in frame 54 upon the axis of roller 55 as a center, is a link 58, the opposite end of which is pivotally attached to the upper end of a lever 59 journaled at 60 in the bed plate of the machine, the lower end of said latter lever being apertured to receive a rod 61 which at its free end is provided with a suitable weight or weights, as at 62. An operating lever 63 upon the opposite eccentric shaft 64 is connected by means of a link 65 to insure an equal rotative movement of the shafts when the same are rotated. The operation of this embodiment of our invention, which should be to a large extent obvious from the above description, is substantially as follows:—Assuming that the parts are in the position shown in Fig. 6 of the drawings, with the uppermost surfaces of the platens constituting the A series in contact with the lowermost series of platens constituting the B series, a further rotative movement of ratchet wheel 48 by means of pawl 50 will cause rod 53 to be moved in a downward direction and roller 55 to roll downward upon the planed surface of lever 56, weights 62 being lifted during this downward movement. When, however, roller 55 is carried downward to an extent sufficient to carry the same to the other side of the center of shaft 57, link 58 through its connection with weights 62 will cause said lever to swing and thus rotate the eccentric shafts through the above-described connections, whereby the other set of opposing faces of the platens will be carried into contact to press the veneer, which has been previously inserted therebetween; in other words, levers 56 and 63 by means of roller 55 and its connection with the weights 62 is caused to swing in opposite directions in accordance with the relative position of said roller with respect to the center of shaft 57. A pawl 66 is provided as at 67 to engage the teeth of the ratchet wheel and prevent a retrograde movement thereof.

In the embodiment of our invention shown in Figs. 7 and 8, the operating lever is swung in opposite directions by means of a retractile spring 68 adjustably connected with a fixed part of the bed plate as at 69, and with a link 70 which in turn is connected with roller 55. This spring, as in the case of weights 62, operates to swing levers 56 and 63 in opposite directions in accordance with the position of roller 55 upon operating lever 56. It will accordingly be seen that we have provided mechanism well adapted to attain, among others, the objects and ends above pointed out.

Among the important advantages secured by means of our construction is that it is not necessary to disturb the operation of the machine when loading or unloading the same, as one half of the machine is in the act of drying veneer while the other half may be loaded or unloaded. Veneer of different thicknesses may be dried at the same time, veneer of one thickness being inserted between one series and a different thickness of veneer between the opposite series. The balancing of the two series of platens also secures an important advantage, inasmuch as the cost of power is substantially negligible as compared with machines as hitherto constructed. Another important advantage accrues by reason of the fact that all the plates constituting each series are given a rigid and permanent steam connection, thus avoiding the multiplicity of flexible steam joints as in prior constructions, outside steam connections being made with each body as a whole, and the movement of each series is so slight that no provision is required by way of flexible joints; thus the loss by leakage of steam incident to prior types of machines is entirely avoided.

It will be understood, of course, that a greater or less number of rigidly connected platens may be employed, or that several machines could be arranged to operate from a single pair of eccentric shafts. Inasmuch as pressure may be applied with different degrees upon the veneer, the same is given a chance to shrink without splitting. As soon as the veneer is dry it may be removed from between the plates and fresh veneer inserted. The process of loading and unloading in no wise interferes with the continuous operation of drying, because during loading and unloading operations in the open spaces provided between the platens the drying operation is taking place between the surfaces of the platens which are close together.

While we have shown our invention as adapted for drying veneer, it is obvious that the same may be employed in other analogous relations, it having been demonstrated that the same will work to great advantage upon lumber of greater thickness.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described our invention, what we claim as new and desire to secure by Letters Patent is:

1. In a veneer drier, in combination, a plurality of sets of platens, the individual platens of each set being connected to one another, and means for moving one of said sets relatively to the other.

2. In a veneer drier, in combination, a plurality of sets of platens, the individual platens of each set being rigidly connected to one another, and means for simultaneously moving said sets relatively to one another.

3. In a veneer drier, in combination, a plurality of series of platens, the individual platens of each series being disposed in alternate relation with those of another series thereof, and means for moving said series relatively to one another.

4. In a veneer drier, in combination, a plurality of series of rigidly connected platens, the platens of each series being disposed in alternate relation with those of another series, and means for moving each of said series bodily relatively to another series.

5. In a veneer drier, in combination, a series of rigidly connected platens, a second series of rigidly connected platens, the platens of said series being disposed in alternate relation and adapted to press veneers upon their upper and lower surfaces, and means for moving said series relatively to each other.

6. In a veneer drier, in combination, a series of rigidly connected platens, a second series of rigidly connected platens, the platens constituting each series being disposed in alternate relation with those of another series and adapted to press veneers upon their upper and lower surfaces, and means for moving said series in opposite directions, whereby veneers are pressed alternately between the upper and lower faces of adjacent platens of the first and second series respectively and between the lower and upper faces of the first and second series respectively.

7. In a veneer drier, in combination, a series of rigidly connected platens, a second series of rigidly connected platens, the platens constituting said series being disposed in alternate relation, and means adapted alternately to move said series in opposite directions whereby veneers are pressed alternately between opposing faces of the adjacent platens.

8. In a veneer drier, in combination, a pair of series of rigidly connected platens, the platens of one series being disposed intermediate those of the other, and means for moving one of said series toward and from the other thereof.

9. In a veneer drier, in combination, a pair of series of rigidly connected platens, the platens of one series being disposed intermediate those of the other, and means adapted alternately to move one of said series toward and from the other, whereby veneers are pressed alternately between opposing faces of adjacent platens.

10. In a veneer drier, in combination, a pair of series of platens each of which is adapted to press veneers upon its opposite faces, the platens constituting each series being rigidly connected, and means for moving the platens of one series toward and from those of the other series.

11. The combination, in veneer drying apparatus, of a pair of series of platens, the platens constituting each series being rigidly connected and disposed in alternate relation with those of the other series, and means for moving one series relatively to the other whereby certain opposing faces of adjacent platens coöperate to press veneers and other opposing faces of adjacent platens are spaced apart.

12. The combination, in veneer drying apparatus, of a pair of series of platens, the platens contituting each series being rigidly connected and disposed in alternate relation with those of the other series, and means for moving one series relatively to the other whereby certain corresponding faces of said series coöperate with the opposite faces of the other series to press veneers and the opposite faces of both series are spaced apart.

13. The combination, in veneer drying apparatus, of a pair of series of platens, the platens constituting said series being disposed in alternate relation, and means for moving one of said series with respect to the other, whereby closures are effected between certain opposing faces of said platens and apertures provided between other opposing faces thereof.

14. The combination, in veneer drying apparatus, of a pair of series of platens, the platens constituting each series being rigidly connected and disposed in alternate relation with those of the other, and means for moving said series relatively to each other, whereby closures are effected between certain opposing faces of said platens and apertures provided between other opposing faces thereof.

15. In veneer drying apparatus, in combination, a plurality of series of rigidly connected platens, and means for moving said series relatively to one another to effect closures between certain opposing faces of said platens and to provide apertures between other opposing faces thereof.

16. In a veneer drier, in combination, a plurality of series of platens, the individual platens of each series being disposed in alternate relation with those of another series thereof, and means for moving said series relatively to one another to effect closures between certain opposing faces of said platens and to provide apertures between other opposing faces thereof.

17. In a veneer drier, in combination, a series of rigidly connected platens, a second series of rigidly connected platens, the platens of each series being disposed in alternate relation and adapted to press veneers upon their upper and lower faces, and means for moving said series relatively to each other, whereby closures are effected between certain opposing faces of said platens and apertures provided between other opposing faces thereof.

18. In a veneer drier, in combination, a series of rigidly connected platens, a second series of rigidly connected platens, each series being disposed in alternate relation with those of the other series and adapted to press veneers upon their upper and lower surfaces, and means for moving said series in opposite directions, whereby closures are effected between the upper and lower faces of adjacent platens of the first and second series respectively and apertures provided between the lower and upper faces of the said first and second series respectively.

19. In a veneer drier, in combination, a pair of series of rigidly connected platens, the individual platens of one series being disposed intermediate the individual platens of the other, and means for moving said series in opposite directions, whereby closures are effected between certain opposing faces of said platens and apertures provided between other opposing faces thereof.

20. In a veneer drier, in combination, a pair of balanced series of platens, and means for moving said series relatively to each other.

21. In a veneer drier, in combination, a pair of balanced series of platens, the platens constituting each series being rigidly connected, and means for moving said series relatively to each other.

22. In a veneer drier, in combination, a series of rigidly connected platens, a second series of rigidly connected platens, and means arranged in the support of said platens whereby one series counterbalances the other.

23. In a veneer drier, in combination, a pair of series of platens, the platens constituting said series being rigidly connected, means for balancing said series, and means coöperating with said balancing means for for moving said series relatively to each other.

24. In a veneer drier, in combination, a pair of series of platens, the individual platens of each series being disposed in alternate relation with those of another series, means for balancing said series, and means coöperating with said balancing means for moving each of said series with relation to the other.

25. In a veneer drier, in combination, a pair of series of rigidly connected platens, each of the platens of one series being disposed intermediate a pair of adjacent platens of the other series, means for balancing said series, and means coöperating with said balancing means for moving said series relatively to each other.

26. In a veneer drier, in combination, a pair of series of rigidly connected platens, each of the platens of one series being disposed intermediate a pair of adjacent platens of the other series, means for counterbalancing said series, and means for moving one of said series toward and from each other, whereby closures are effected between certain opposing faces of said platens and apertures provided between other opposing faces thereof.

27. In a veneer drier, the combination of a series of platens, a second series of platens, the platens of each series being disposed in alternate relation with those of the other, means for causing one of said series to counterbalance the other, and means for moving said series with respect to the other, whereby closures are effected between corresponding faces of one series and the oppositely disposed corresponding faces of the other series, the opposed corresponding faces of the first series and the oppositely disposed corresponding faces of the second series being spaced apart.

28. In a veneer drier, in combination, a pair of series of rigidly connected platens, the platens of said series being disposed in alternate relation, means for balancing said series, and means connected with said balancing means for moving said series in opposite directions, whereby closures are effected between certain opposing faces of said platens and apertures provided between other opposing faces thereof.

29. In a veneer drier, in combination, a series of platens disposed horizontally and arranged one above another, a second series of similarly disposed platens, the platens of one series being disposed in alternate relation with those of the other, means for moving one of said series upward, means for moving the other series downward, or vice versa, said moving means being so disposed that one of said series counterbalances the other, and means operatively associated with said moving means for causing them to move in unison.

30. In a veneer drier, in combination, a series of platens disposed horizontally and arranged one above another, a second series of similarly disposed platens, the platens of one series being disposed in alternate relation with those of another, oppositely disposed eccentric shafts arranged in the support of each of said series, and means for moving said shafts, whereby one of said series may be lowered and the other series raised.

31. In a veneer drier, in combination, a series of platens disposed horizontally and arranged one above another, a second series of similarly disposed platens, the platens of one series being disposed in alternate relation with those of the other, oppositely disposed eccentric shafts supporting each of said series, means for moving said shafts whereby one of said series may be lowered and the other series raised, and means for connecting said shafts whereby they move in unison.

32. In a veneer drying apparatus, in combination, a series of platens disposed horizontally and arranged one above another, a second series of similarly disposed platens, the platens of one series being disposed in alternate relation with those of the other, and means for moving one of said series upward and for simultaneously moving the other series downward and vice versa, whereby closures are effected between certain opposing faces of said platens and apertures provided between other opposing faces thereof.

33. In veneer drying apparatus, in combination, a series of platens disposed horizontally and arranged one above another, a second series of similarly disposed platens, the platens of one series being disposed in alternate relation with those of the other, a pair of shafts having oppositely disposed eccentric portions supporting each of said series, and means for rotating said shafts whereby one of said series may be lowered and the other series simultaneously raised to effect closures between certain opposing faces of said platens and provide apertures between other opposing faces thereof.

34. In veneer drying apparatus, in combination, a series of platens disposed horizontally and arranged one above another, a second series of similarly disposed platens, the platens of one series being disposed in alternate relation with those of the other, a pair of shafts having oppositely disposed eccentric portions arranged in the support of each of said series, means for rotating said shafts whereby one of said series may be lowered and the other raised to effect closures between certain opposing faces of said platens and provide apertures between other opposing faces thereof, and means for connecting said shafts whereby they are compelled to move in unison.

35. In a veneer drying apparatus, in combination, a pair of series of platens and means for moving the platens, constituting said series relatively to each other, whereby veneers may be pressed, and means coöperating with said moving means for holding said platens against veneers with varying degrees of pressure.

36. In veneer drying apparatus, in combination, a pair of series of rigidly connected platens, the platens constituting each series being disposed in alternate relation with those of another series, means for moving the two series of platens relatively to each other series, whereby veneers may be pressed, and means coöperating with said moving means for holding said platens against the veneers with varying degrees of pressure.

37. In veneer drying apparatus, in combination, a series of rigidly connected platens, a second series of rigidly connected platens, the platens constituting each series being disposed in alternate relation with those of the other series, and adapted to press veneers upon their upper and lower surfaces, means for moving said series in opposite directions whereby veneers are pressed alternately between the upper and lower faces of adjacent platens of the first and second series respectively and between the lower and upper faces of the first and second series respectively, and means coöperating with said moving means for holding the platens in contact with the veneers with varying degrees of pressure.

38. In a veneer drier, in combination, a pair of series of rigidly connected platens, the platens of one series being disposed intermediate those of the other, means for moving one of said series toward and from the other thereof, whereby veneers are pressed between the oppositely disposed faces of the platens, and means coöperating with said moving means for holding said platens in contact with the veneers with varying degrees of pressure.

39. The combination in veneer drying apparatus, of a pair of series of platens, the platens constituting each series being disposed in alternate relation with those of the other series, means for moving said series relatively to each other whereby closures are effected between certain opposing faces of said platens and apertures provided between other opposing faces thereof, and means connected with said moving means for holding said platens against the veneers with different degrees of pressure.

40. In veneer drying apparatus, in combination, a pair of series of rigidly connected platens adapted to press veneers, each of the platens of one series being disposed intermediate a pair of adjacent platens of the other series, means for counterbalancing said series, means for moving said series toward and from each other whereby closures are effected between certain opposing faces of said platens and apertures, provided between other opposing faces thereof, and means for holding said platens in contact with the veneers with different degrees of pressure.

41. In veneer drying apparatus, in combination, a series of platens disposed horizontally and arranged one above another, a second series of similarly disposed platens, the platens of one series being disposed in alternate relation with those of the other series, oppositely disposed eccentric shafts supporting each of said series, means for moving said shafts to lower one series and simultaneously raise the other thereof, and means operating through said shafts to hold the platens against the veneers with different degrees of pressure.

42. In veneer drying apparatus, in combination, a series of platens disposed horizontally and arranged one above another, a second series of similarly disposed platens, the platens of one series being disposed in alternate relation with those of the other the opposing faces of adjacent platens being adapted to receive and press veneers, a pair of oppositely disposed eccentric shafts supporting both of said series, means for rotating said shafts whereby one of said series may be lowered and the other series simultaneously raised to effect closures between certain opposing faces of said platens and provide apertures between other opposing faces thereof, and means operating through said last-mentioned means whereby the platens may be held in contact with the veneers with varying degrees of pressure.

43. In veneer drying apparatus, in combination, a series of platens disposed horizontally and arranged one above another, a second series of similarly disposed platens, the platens of one series being disposed in alternate relation with those of the other, a pair of oppositely disposed eccentric shafts, supporting both of said series, a lever on each of said shafts, a link connecting said levers whereby said shafts are compelled to move in unison, and means upon one of said levers adapted to be engaged by the other lever, whereby said platens may be held in contact with the veneers with varying degrees of pressure.

44. In veneer drying apparatus, in combination, a series of platens disposed horizontally and arranged one above another, a second series of similarly disposed platens, the platens constituting each series being rigidly connected and arranged in alternate relation with those of the other series, a pair of shafts having oppositely disposed eccentric portions arranged in the support of said series, and an operating lever upon each of said shafts adapted to rotate the same, whereby one of said series may be lowered and the other raised to effect closures between certain opposing faces of said platens and provide apertures between other opposing faces thereof, and means upon one of said levers adapted to be engaged by the other of said levers, whereby the closed faces of the platens may be held in contact with the veneers with varying degrees of pressure.

45. In veneer drying apparatus, in combination, a series of platens disposed horizontally and arranged one above another in vertical alinement, a second series of similarly disposed platens, the platens constituting each series being rigidly connected and arranged in alternate relation with those of the other series, a pair of shafts each of which has oppositely disposed eccentric portions arranged in the support of each of said series of platens, and an operating lever upon each of said shafts adapted to rotate the same whereby one of said series may be lowered and the other simultaneously raised to effect a closure between certain opposing faces of said platens and provide apertures between other opposing faces thereof, and a stepped device upon one of said levers adapted to be engaged by the other thereof, whereby the platens may be closed against veneers with different degrees of pressure.

46. In veneer drying apparatus, a series of platens disposed horizontally and arranged one above another in vertical alinement, a second series of similarly disposed platens, the platens constituting each series being rigidly connected at their outer edges, and the individual platens of each series being arranged intermediate adjacent platens of the other series, a pair of shafts arranged beneath said series, each of which has oppositely eccentric portions, blocks journaled upon said eccentric portions and interposed in the support of said series of platens, an operating lever upon each of said shafts adapted to rotate the same whereby one of said series may be lowered and the other raised to effect closures between certain opposing faces of said platens and to provide apertures between other opposing faces thereof, a connection between said shafts whereby they are compelled to move in unison, and a plurality of stepped devices carried by one of said levers adapted to be engaged by the other lever to hold either set of oppositely disposed faces in a closed position, said stepped device also coöperating with the said lever to hold the platens in contact with the veneers with varying degrees of pressure.

47. In a veneer drier, in combination, a pair of sets of hollow platens, and means rigidly connecting the individual platens of each of said sets to one another, whereby said sets may be moved relatively to one another, said connecting means comprising conduits adapted to convey a heated medium to the platens with which they are associated.

48. In a veneer drier, in combination, a plurality of series of rigidly connected platens, means for moving said series relatively to one another, and a conduit communicating with the rigid connecting means for each of said series of platens adapted to conduct steam thereto.

49. In a veneer drier, in combination, a series of hollow platens, each of which is provided with a plurality of hollow perforated ears, hollow spacing collars interposed between the ears of adjacent platens of each series, rods extending through said ears and collars whereby the platens constituting each series are rigidly connected, said ears and collars forming a conduit through which steam is conducted to the platens, a conduit for supplying steam to each of said series of platens, and means for moving one of said series with respect to the other.

50. In a veneer drier, in combination, a pair of series of hollow platens each of which is provided with lateral hollows ears, said ears having apertures extending therethrough, hollow spacing collars interposed between the ears of adjacent platens whereby a steam conducting conduit is provided for conducting steam into said platens, a rod extended through said ears and spacing collars whereby each series of platens are rigidly connected, a conduit for conducting steam to each series of platens at their upper portions, a discharge conduit leading from each series of platens at their lower portions, a pair of shafts arranged beneath said series, said shafts having oppositely disposed eccentric portions, bearing blocks journaled upon said eccentric portions, operating levers carried by said shafts adapted to rotate the same whereby one series of platens may be raised and the other simultaneously lowered to effect closures between certain of the opposing faces of said platens and to provide apertures between other opposing faces thereof, and a link connecting said operating lever whereby a movement of one thereof compels an equal movement of the other.

51. In a veneer drying apparatus, a pair of series of platens each of said series being comprised by a rigid structure constituted by hollow platens having hollow lateral ears which lead thereinto, hollow spacing collars interposed between said ears, said ears and collars forming hollow conduits extending transversely of the series, and a rod extended through said ears and collars adapted to form a rigid connecting means between each series of platens, a conduit for conducting steam into each of the columns constituted by said ears and collars of each series, a discharge conduit similarly connected with said series, a pair of shafts each of which has oppositely disposed eccentric portions, journal blocks located upon said eccentric portions and interposed in the support of each of said series, an operating lever upon each of said shafts adapted to rotate the same whereby one of said series of platens is raised and the other simultaneously lowered to carry opposing faces of the platens constituting said series into engagement with the veneer and to space apart opposite opposing faces of said platens, a link connecting said levers whereby one of said shafts moves in unison with the other, and a pair of oppositely disposed shouldered disks upon one of said levers adapted to be engaged by the other lever whereby either set of the opposing faces of said platens may be held in contact with the veneers with varying degrees of pressure.

52. In a veneer drier, in combination, a plurality of sets of platens, the individual platens of each set being disposed in alternate relation with those of another set thereof, and means for moving one of said sets relatively to the other.

53. In a veneer drier, in combination, a plurality of sets of platens, the individual platens of each set being disposed in alternate relation with those of another set thereof, and means for simultaneously moving said sets relatively to one another.

In testimony whereof we affix our signatures, in the presence of two witnesses.

LOUIS G. MERRITT.
BURTON L. GALE.

Witnesses:
Jos. J. GUMNELL,
WILLIAM H. RICE.